United States Patent Office 3,267,762
Patented August 23, 1966

3,267,762
CONTROL CIRCUIT FOR AN AUTOMATIC ROAD VEHICLE TRANSMISSION MECHANISM
Hardev Reval, Eastcote, Middlesex, England, assignor to C.A.V. Limited, London, England
Filed Dec. 3, 1962, Ser. No. 241,890
29 Claims. (Cl. 74—365)

The object of this invention is to provide a control circuit for an automatic transmission mechanism for a road vehicle in a convenient form.

A transmission mechanism control circuit in accordance with the invention comprises at least three electromagnets which are adapted when energised to engage three gears respectively of the road vehicle, a common transistor through which current must flow to energise the electromagnets, means for rendering the transistor conductive when the accelerator pedal of the vehicle is depressed, means for rendering the transistor conductive when the engine speed exceeds a predetermined value, and switch means operable at selected engine speeds to allow alternative energisation of the electromagnets.

Throughout this specification references to "engine speed" are intended to refer to the rotational speed of a part driven by the engine at the output side of the gearbox rather than the input side thereof. This will be clear from the figures quoted in the description, because those figures increase continuously, whereas the rotational speed of a part at the input side of the gearbox would of course be reduced each time an upward gear change were made. Moreover, it can be seen from the magnitudes of the figures quoted that they cannot be rotational speeds at the input side of the gearbox.

Figure 1:
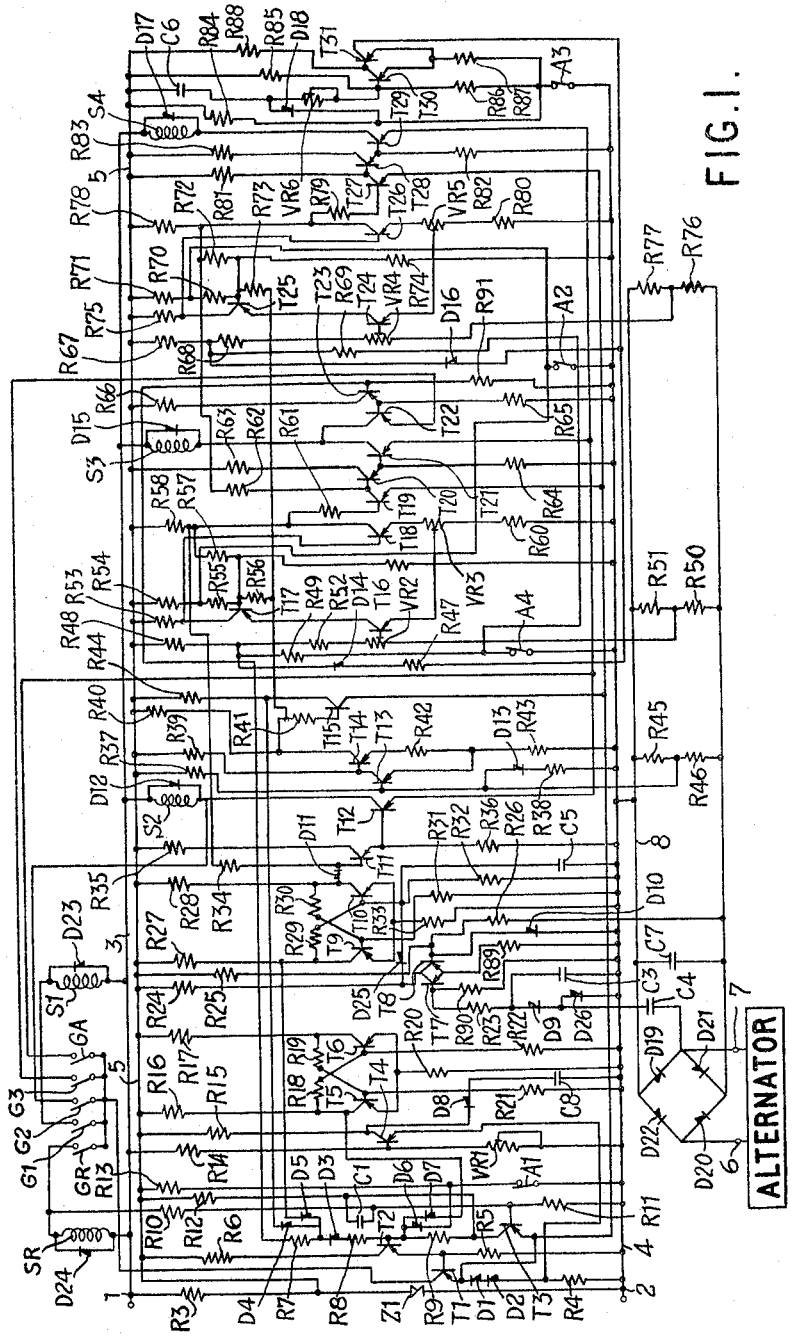
Figure 2:
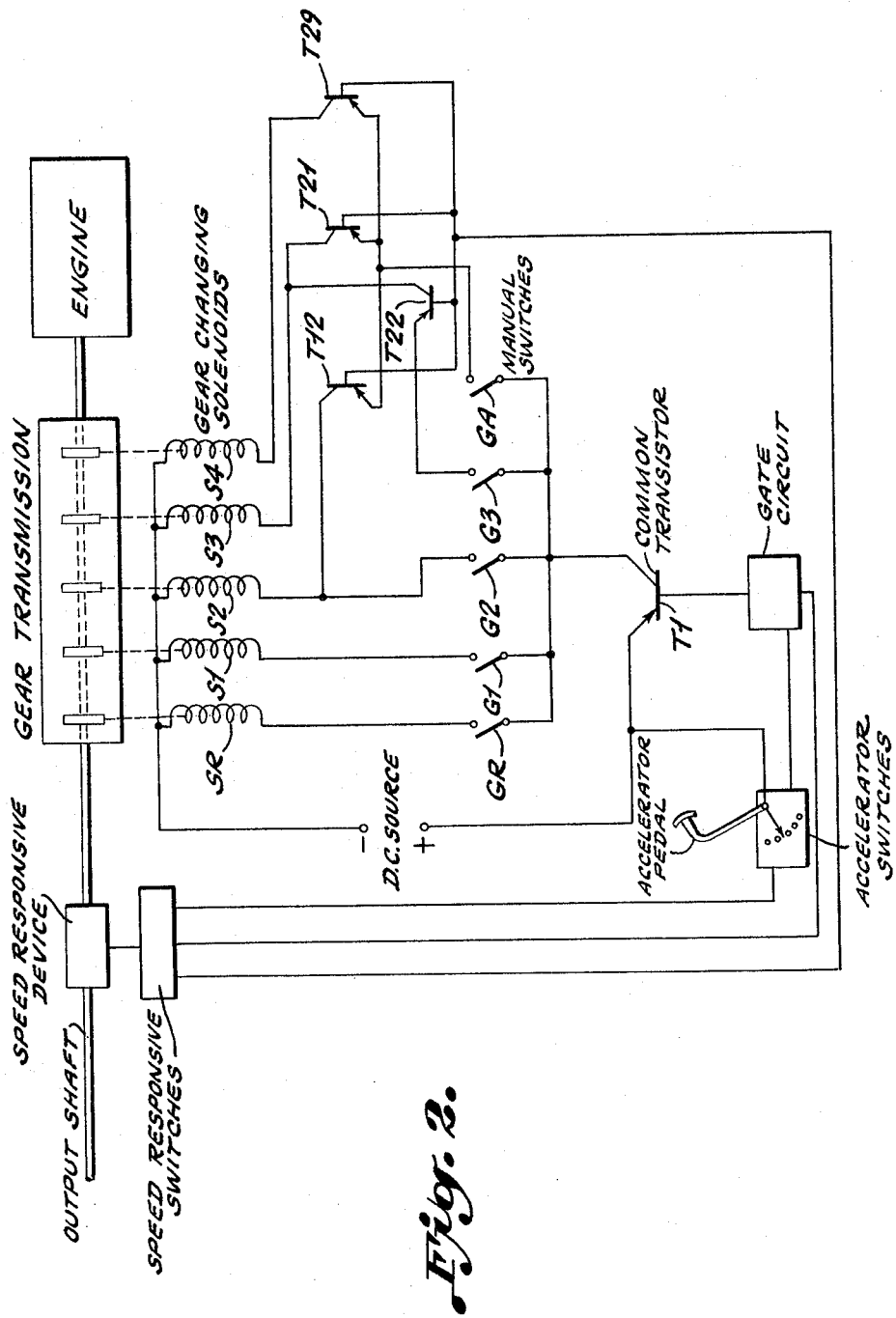

In the accompanying drawings FIGURE 1 is a circuit diagram illustrating one example of the invention, whilst FIGURE 2 is a diagrammatic illustration of the complete system.

The general operation of the circuit can be understood with reference to FIGURE 2. Solenoids SR, S1, S2, S3 and S4 serve when energised to engage reverse, first, second, third and fourth gears respectively of a gear transmission driven from an engine, and manually operable switches GR, G1, G2, G3 and GA are provided in circuit with the solenoids. However, under no circumstances can any gear be engaged unless transistor T1 conducts. Conduction of transistor T1 is controlled by a gate circuit which is operated to render transistor T1 conductive by an accelerator switch or a speed sensitive switching circuit controlled by a speed responsive device driven by the output shaft of the transmission.

Reverse, first and second gears are engageable manually on closing of switches GR, G1, G2 respectively.

Third gear is engageable manually on closing of switch G3 provided transistor T22 is held conductive by the speed responsive switching circuit.

Second, third and fourth gears are engageable automatically on closing of switch GA, the speed responsive gear to be engaged being controlled by the switching circuit acting on transistors T12, T21 and T29 respectively.

The accelerator switches vary the speeds at which gears are changed as indicated.

The complete circuit and detailed operation will now be described with reference to FIGURE 1, wherein there are provided first and second terminals 1, 2 adapted for connection to a source of direct or rectified alternating current so as to be of negative and positive polarity in use respectively. The terminals are bridged by a resistor R3 and a Zener diode Z1, and connected to the terminals 1, 2 respectively are two lines 3, 4. There are further provided a plurality of switches GR, G1, G2, G3 and GA, which are associated with a lever similar to the ordinary mechanical gear lever of a vehicle, and are arranged to be closed when the lever is moved to positions which in mechanical gear correspond to reverse gear, first gear, second gear, third gear and top gear respectively. The movable contacts of these switches are connected to the collector of a main power transistor T1, the emitter of which is connected through diodes D1, D2 and a resistor R4 in series to the line 4.

The base of the transistor T1 is connected to the line 4 through a resistor R5, and is also connected to the emitter of a transistor T2, the collector of which is connected through a resistor R6 to a line 5. The line 5 is connected to a point intermediate the Zener diode Z1 and the resistor R3, so that its voltage is stabilized by the Zener diode. The base of the transistor T2 is connected through a resistor R9 to the collector of a transistor T3, the emitter of which is connected to the emitter of the transistor T1. The base of the transistor T3 is connected to the line 4 through a resistor R11, and is also connected through a resistor R10 to the fixed contact of the switch GR, this fixed contact being further connected to the line 3 through a solenoid SR bridged by a diode D24. Moreover, the base and collector of the transistor T3 are interconnected through a capacitor C1, whilst the collector of the transistor T3 is connected to the line 5 through a resistor R12.

The base of the transistor T2 is further connected through a diode D6 and a resistor R13 to the line 5, and is also connected through the diode D6 to the fixed contact of a switch A1. The switch A1 is normally closed and is one of a number of switches operable by the accelerator pedal of the vehicle in a manner to be described. The movable contact of the switch A1 is connected to the line 4.

The lines 3, 4 are further bridged by a resistor R14 and a variable resistor VR1 in series, a point intermediate these resistors being connected to the base of a transistor T4. The collector of this transistor is connected through a resistor R15 to the line 5 and its emitter is connected to a point intermediate the resistor R4 and diode D2. The collector of the transistor T4 is further connected through a diode D8 and a capacitor C8 to the line 4, a point intermediate the diode D8 and capacitor C8 being connected to the base of the transistor T5.

The base of the transistor T2 is further connected through a diode D7 to the collector of the transistor T5, which forms one of a pair of transistors T5, T6 having their emitters connected to the line 4 through a resistor R20. The bases of the transistors T5, T6 are connected to the line 4 through resistors R21, R22 respectively whilst their collectors are connected to the line 5 through resistors R16, R17 respectively. Furthermore the bases of the transistors T5, T6 are connected to the collectors of the transistors T6, T5 respectively through resistors R19, R18.

The apparatus further includes an alternator A for producing an electrical signal of frequency proportional to the engine speed of the vehicle. This signal is fed to terminals 6, 7 and thence to a full wave rectifier consisting of diodes D19, D20, D21, D22 which provide a D.C. output for negative and positive lines 8, 9 respectively, the magnitude of the D.C. output being proportional to the engine speed. The lines 8, 4 are interconnected, and the lines 8, 9 are bridged by four parallel circuits containing respectively a capacitor C7, resistors R45 and R46 in series, resistors R51 and R50 in series, and resistors R77 and R76 in series. The terminal 7 is connected to the line 4 through parallel paths one of which contains a capacitor C4 and a diode D26 in series and the other of which contains the capacitor C4, a diode D9 and a capacitor C3 in series. A point intermediate the diode D9 and capacitor C3 is connected through a resistor R23 to the base of a transistor T7, the base of this transistor being further connected through a resistor R90 to the line 4. The collector and emitter of the transistor T7 are connected respectively to the collector and emitter of a further transistor T8, and the collectors and emitters of the transistors T7, T8 respectively are connected to the lines 5, 4 through resistors R24, R89. Further, the collectors of the transistors T7, T8 are connected to the line 4 through a diode D25 and a capacitor C5 in series, whilst the base of the transistor T8 is connected to the line 5 through a resistor R25, to the line 4 through a diode D10, and to the line 9 through a resistor R26.

A point intermediate the diode D25 and capacitor C5 is connected to the base of a transistor T10 forming one of a pair of transistors T9, T10 having their collectors connected to the line 5 through resistors R27, R28 respectively, their bases connected to the line 4 through resistors R31, R32 respectively and their emitters connected to the line 4 through a common resistor R33. Moreover, the bases of the transistors T9, T10 are connected to the collectors of the transistors T10, T9 respectively through resistors R30, R29. The collector of the transistor T9 is connected to the base of the transistor T2 through a diode D5, a diode D3 and a resistor R8 in series.

The collector of transistor T10 is connected through a diode D11, to the base of a transistor T11, the collector of which is connected to the line 5 through a resistor R35. The emitter of the transistor T11 is connected to the base of the transistor T12, and through a resistor R36, to the line 4. The emitter of the transistor T12 is connected to the fixed contact of the switch GA, whilst its collector is connected to the fixed contact of the switch G2. The collector of the transistor T12 is further connected to the line 3 through a solenoid S2 bridged by a diode D12.

A point intermediate the resistors R45, R46 is connected to the line 4 through a diode D13 and a resistor R38, and is also connected to the base of a transistor T13, the base of this transistor being further connected to the line 5 through a resistor R37. The emitter of the transistor is connected to the line 4 through a resistor R43 whilst its collector is connected to the base of a transistor T14, and also, through a resistor R39, to the line 5. The emitter of the transistor T14 is connected to the line 4 through a resistor R42 and the resistor R43, whilst its collector is connected through a resistor R40 to the line 5 and through a resistor R41 to the base of a transistor T15, the collector of which is connected to the line 5 through a resistor R44. Moreover, the emitter of the transistor T15 is connected to the emitter of the transistor T3, whilst the collector of the transistor T15 is connected through a diode D4 to a point intermediate the diodes D3, D5.

A point intermediate the resistors R50, R51 is connected to the line 5 through a variable resistor VR2, the resistor R52, and the resistor R48 in series, a point intermediate the resistors R48, R52 being connected to the line 4 through the resistor R49 and an accelerator switch A4. A point on the variable resistor VR2 is connected to the base of the transistor T16 the emitter of which is connected to a point on the variable resistor VR3. One end of this resistor is connected to the line 4 through a resistor R60 whilst its other end is connected to the emitter of a transistor T18. The collector of the transistor T18 is connected through a resistor R58 to the line 5, through a resistor R34 to the base of a transistor T11, and through a resistor R57 to the base of a transistor T17, the emitter of which is connected to the collector of the transistor T16. The collector of the transistor T17 is connected to the base of the transistor T18, and, through the resistor R53, to the line 5, whilst the base of the transistor T17 is connected through a resistor R56 and the resistor R41 in series to the base of the transistor T15, and is also connected through a resistor R59 to the line 4. The base of the transistor T17 is also connected through resistors R55, R54 to the line 5.

The collector of the transistor T18 is further connected through a resistor R61 to the base of a transistor T19 having its emitter connected to the emitter of the transistor T3. The collector of the transistor T19 is connected to the base of a transistor T20 having its collector connected to the line 5 through a resistor R63 and its emitter connected to the line 4 through a resistor R64, and also connected to the base of a transistor T21. The emitter of the transistor T21 is connected to the fixed contact of the switch GA whilst its collector is connected to the line 3 through a solenoid S3 bridged by a diode D15 and is also connected to the collector of a transistor T22. The emitter of the transistor T22 is connected to the fixed contact of the switch G3 whilst its base is connected through a resistor R65 to the line 4, and also to the emitter of a transistor T23 the collector of which is connected to the line 5 through a resistor R66. The base of the transistor T23 is connected to the line 4 through a resistor R91 and is also connected through a resistor R7 to a point intermediate the diodes D3, D5.

A point intermediate the resistors R77, R76 is connected to the line 5 through a variable resistor VR4, a resistor R68 and a resistor R67 in series, a point intermediate the resistors R67, R68 being connected through a resistor R69 to the fixed contact of the switch A4; the movable contact of a variable resistor VR4 is connected to the base of a transistor T24 the collector of which is connected to the emitter of a transistor T25 and the emitter of which is connected to the movable contact of a variable resistor VR5. One end of the variable resistor VR5 is connected to the line 4 through a resistor R80 whilst its opposite end is connected to the emitter of a transistor T26 the base of which is connected to the collector of the transistor T25. The collector of the transistor T26 is further connected to the line 5 through a resistor R78, through a resistor R62 to the base of the transistor T20, and through a resistor R72 to the base of the transistor T25. The base of the transistor T25 is connected through resistors R70, R71, in series to the line 5, through a resistor R74 to the line 4, and through a resistor R73 and the resistor R41 to the base of the transistor T15. Moreover, the collector of the transistor T25 is connected to the line 5 through a resistor R75, whilst the point intermediate the resistors R70, R71 is connected to a fixed contact of an accelerator switch A2, the movable contact of which is connected to the line 4. This fixed contact is also connected to a point intermediate the resistors R54, R55.

The collector of the transistor T26 is also connected through a resistor R79 to the base of a transistor T27 the emitter of which is connected to the emitter of the transistor T3. The collector of the transistor T27 is connected through a resistor R81 to the line 5 and is also connected to the base of a transistor T28, the collector of which is connected to the line 5 through a resistor R83. The emitter of the transistor T28 is connected to the line 4 through a resistor R82, and is also connected to the base of a transistor T29, the emitter of which is connected to the fixed contact of the switch GA. The collector of the transistor T29 is connected to the line 3 through a solenoid F4 bridged by a diode D17.

The circuit further includes an accelerator switch A3, the movable contact of which is connected to the line 4 and the fixed contact of which is connected through a resistor R86 to the base of a transistor T30. The base of the transistor T30 is further connected to the line 5 through parallel circuits one of which contains a resistor R85 and the other of which contains a variable resistor VR6 and a capacitor C6. A point intermediate the capacitor C6 and variable resistor VR6 is connected through a diode D18 to the fixed contact of the switch A3, through the diode D18 and a further resistor R84 to the line 5. The collector of the transistor T30 is connected through a resistor R88 to the line 5, and is also connected to the base of a transistor T31. The emitters of the transistors T30, T31 are connected through a common resistor R87 to the fixed contact of the switch A3. Moreover the collector of the transistor T31 is connected through a resistor R47 and a diode D14 to a point intermediate the resistors R48, R52, and through a diode D15 to a point intermediate the resistors R67, R68.

The fixed contact of the switch G1 is connected through a solenoid S1 to the line 3, the solenoid S1 being bridged by a diode D23.

OPERATION

The circuit described permits the driver to choose reverse, first, second and third gears manually by moving the gear lever to positions to close the switches GR, G1, G2 and G3 respectively. Alternatively, by moving the gear lever to the position to close the switch GA the driver can bring into operation the automatic control which engages one of the second, third and top gears automatically in a manner to be described. The actual engagement of the gears is effected electro-pneumatically upon energisation of the solenoids SR, S1, S2, S3 and S4 respectively.

The operation of the various components will now be described in more detail.

MAIN GATE CIRCUIT

This circuit comprises the power transistor T1 which is in series with each of the switches G, so that when a switch G is closed the appropriate solenoid S can only be energised if the transistor T1 is conductive. The transistor T1 is switched on or off depending on whether the transistor T2, which is connected as an emitter follower, is on or off respectively. The main gate circuit can be switched on (i.e. transistor T1 rendered conductive) by a number of gating signals applied to the base of the transistor T2. One of these signals is provided by the accelerator switch A1, which is opened as soon as the accelerator pedal is depressed to open the gate circuit. The other gating signals will be indicated as the description proceeds.

REVERSE GEAR

When the switch GR is closed, nothing happens until the accelerator pedal is depressed, at which point the switch A1 is opened to switch on the gate circuit and engage reverse gear. At the same time, the normally conductive transistor T3 is switched off and provides an alternative gating signal for the gate circuit. Hence the reverse gear is held engaged irrespective of the position of the switch A1 until the switch GR is re-opened.

FIRST GEAR

The operation of the first gear is dependent solely on the position of the accelerator pedal once the switch G1 has been closed. Operation of the pedal opens the switch A1 and engages first gear, but as soon as the pedal is released the switch A1 closes and the first gear solenoid S1 is de-energised.

MANUAL SECOND GEAR

The operation of second gear when manually selected is similar to first gear, being solely dependent on the switch A1 once the switch GR is closed.

AUTOMATIC SECOND GEAR

The transistor T12 provides an alternative path whereby the solenoid S2 can be energised to engage second gear under certain circumstances, if the switch GA has been closed. The transistor T12 is switched on and off at the same time as the transistor T11, which normally receives a bias to switch it on through the resistors R34, R58. Under certain circumstances (to be described) the transistor T11 is rendered non-conductive so that second gear cannot be engaged automatically, but otherwise second gear will be engaged automatically when the switch GA and the gate circuit are closed.

LOW SPEED STAGE

The low speed stage consists of a Schmitt trigger circuit T13, T14, the transistor T13 being connected to the voltage divider R45, R46 so as to receive a signal of magnitude dependent on engine speed. The circuit is designed to change state when the engine speed reaches 240 r.p.m., but to revert to the original state only when the engine speed falls to 145 r.p.m.

The transistor T14 provides an output to the transistor T15, which through its collector provides an alternative gating signal for the main gate circuit. Thus, the main gate circuit will be held on independently of the switch A1 once the engine speed exceeds 240 r.p.m., unless the engine speed drops below 145 r.p.m.

AUTOMATIC THIRD GEAR

The third gear stage includes a Schmitt trigger T16, T18 fed from the potential divider R50, R51 and designed to change state when the engine speed rises above 735 r.p.m., and to revert to the original state when the engine speed falls below 545 r.p.m. The exact values required are readily obtained by adjustment of the variable resistors VR2, VR3 respectively. The operating speeds are in certain circumstances changed by switches A3, A4 operable by the accelerator pedal, but for the moment the effect of these switches will be discounted.

When the trigger T16, T18 changes state at 735 r.p.m., an output previously provided to the transistor T11 through the resistors R34, R58 is removed, and second gear is disengaged. The change of state also operates the transistor T19.

Conduction of the transistor T19 permits conduction of the pair of transistors T20, T21, so that the solenoid S3 is energised to engage third gear. The reverse cycle of operation occurs when the speed falls below 545 r.p.m., the third gear being disengaged and re-engagement of second gear no longer being prevented.

MANUAL THIRD GEAR

When the switch G3 is closed to engage third gear manually the solenoid S3 can be energised through the transistor T22 provided the latter is switched on by the transistor T23. The latter is under normal circumstances switched on when the low-speed stage has changed state, so that third gear cannot be engaged manually below 145 r.p.m.

AUTOMATIC FOURTH GEAR

The fourth gear stage is similar to the third gear stage, the circuit being switched by signals derived from the potential dividers R76, R77 at engine speeds of 1165 r.p.m. and 950 r.p.m. when the engine speed is increasing and decreasing respectively. The circuit operates as in the third gear stage, but in this case conduction of the transistor T26 provides a signal to the base of the transistor T20 to cause the third gear to be disengaged, and to prevent re-engagement of third gear until fourth gear is disengaged.

ACCELERATOR - CONTROLLED MODIFICATIONS OF AUTOMATIC THIRD AND FOURTH GEAR STAGES

For convenience, the throttle movement is divided into three parts, light, normal and full throttle. As previously explained, the switch A1 is opened on depression of the pedal, and remains open for all settings of the pedal. The effect of the other switches will now be described.

(1) *Effect of switch A2*

In the automatic third gear stage, the transistor T17 can act to hold on the third gear even though the engine speed falls below 545 r.p.m. When the transistor T17 is on, the circuit functions as previously described, but when it is off the transistor T18 is held on below the normal change speed.

The transistor T17 can be gated by three signals. Two of these signals prevent operation of the hold-on-circuit and are obtained from the collector of the transistor T18, and from the collector of the transistor T14 in the low speed stage when the engine speed falls to 145 r.p.m. The first signal ensures that the hold-on condition cannot be assumed before the third gear is engaged, whilst the second ensures that if the hold-on condition is assumed, it will be released at 145 r.p.m., at which point the engine will go into neutral, missing out second gear altogether.

The third signal, which determines whether or not the hold-on condition is to be assumed, is obtained only when the switch A2 is closed. The switch A2 is opened during normal and full throttle, so that the gear is retained only when the pedal is not depressed or is depressed only to the light throttle position.

The transistor T25 in the fourth gear stage performs a precisely similar function. In this case, both third and second gears are missed unless the accelerator pedal is depressed when the engine speed is between 145 r.p.m. and 545 r.p.m., in which case the engine will change directly from fourth to second gear.

(2) Effect of switches A3, A4

The purpose of the switch A3 is to raise the speed at which the change of gear from second to third, or from third to fourth, occurs, so as to permit more rapid acceleration. The switch operates in this manner only when it is open (i.e.), at the normal and full throttle settings. The purpose of the switch A4 is to raise the speed at which the change occurs still further, this switch being opened only at full throttle.

TIMING CONTROL ASSOCIATED WITH SWITCH A3

When during normal throttle the switch A3 is open and the vehicle is in second or third gear, easing of the pedal to the light throttle position will close the switch A3 and may cause third or fourth gear to be engaged. This may not be desirable if the pedal has been eased only momentarily as a result of a temporary obstruction in the path of the vehicle, and a timing control is included to delay the gear change due to closing of the switch A3 for about three seconds, so that a distinction is made between a temporary and a long-term easing of the pedal. The timer is constituted by the Schmitt trigger T30, T31 and associated capacitor C6, the arrangement being such that on closing of the switch A3, the trigger cannot change state until the capacitor C6 is charged. The delay period can be set by the resistor VR6.

TWO-GEAR PROTECTION

With certain types of gear it is possible through a fault for two gears to be selected simultaneously, and a protection circuit is included to provide for this contingency.

Current flowing to operate a gear flows through the resistor R4, the voltage across which is applied to the transistor T4. The base voltage of this transistor is adjusted by the variable resistor VR1 so that the transistor T4 is just conductive. However, if two gears are selected simultaneously, the voltage across the resistor R4 doubles and the transistor T4 is cut off, thereby triggering the bistable circuit T5, T6, which in turn cuts off the main gate circuit.

SIGNAL FAILURE PROTECTION CIRCUIT

The signal failure protection circuit is incorporated to prevent second gear from being engaged at high speeds as a result of a fault. The circuit includes a bistable circuit T9, T10 which is normally in one state and has no effect, but which when a fault occurs is driven to its alternative state, in which it biases the transistor T11 to prevent engagement of second gear, so that the transmission is returned to neutral. A secondary effect of the circuit is to bias the transistor T23 to allow third gear to be engaged manually even though a signal is produced corresponding to an engine speed below 145 r.p.m.

The circuit is operated by reciving an unrectified signal from the terminal 7, which is supplied to the diode pump integrator C4, D26, D9 and C3 and thence to the base of the transistor T7. The base of the transistor T8 is fed from the line 9 so that the transistor T8 is on until the engine speed reaches 600 r.p.m. but is then switched off. Thus, above 600 r.p.m. any failure resulting in the transistor T7 being switched off will trigger the bistable circuit T9, T10 to its operative state.

Having thus described my invention what I claim as new and desire to secure by Letters Patent is:

1. A control circuit for an automatic road vehicle transmission mechanism having an accelerator pedal and three automatically controllable gears, comprising three electromagnets which are adapted when energised to engage said three gears respectively, a D.C. source having one terminal connected to one end of each of the electromagnets, a common transistor connected between the other ends of the electromagnets and the other terminal of the D.C. source so that current flowing to any electromagnet must flow through the common transistor, means for rendering said common transistor conductive when said accelerator pedal is depressed, means for rendering said common transistor conductive when the vehicle engine speed exceeds a predetermined value, and switch means between the common transistor and the electromagnets, and means responsive to engine speed for operating the switch means at selected engine speeds to allow selective energisation of the electromagnets, said circuit further including means for switching off said common transistor in the event of simultaneous engagements of two gears.

2. A circuit as claimed in claim 1 in which the means for switching off said common transistor in the event of simultaneous engagement of two gears comprises a resistor in the emitter-collector circuit of said common transistor, a second transistor having its base and emitter connected across said resistor, a biasing circuit serving to overcome the bias imposed by the resistor when current flows through the resistor to operate a gear, and thereby maintain the second transistor conductive, and means for holding said common transistor non-conductive when the second transistor is non-conductive, simultaneous engagement of two gears increasing the current flow in the resistor and rendering the second transistor non-conductive.

3. A circuit as claimed in claim 2 in which the switch means is constituted by a plurality of transistors.

4. A circuit as claimed in claim 1 including switches operable by the vehicle accelerator pedal for varying said selected engine speeds.

5. A circuit as claimed in claim 1 including an engine-driven alternator and associated full-wave rectifier for producing a voltage dependent on engine speed, and a first bistable circuit drivable from a first state to a second state when said voltage rises to a value corresponding to a first engine speed, the first bistable circuit being driven back to its first state at a second engine speed lower than the first engine speed, and the first bistable circuit serving when in its second state to maintain the common transistor conductive.

6. A circuit as claimed in claim 5 in which the first bistable circuit is a Schmitt trigger.

7. A circuit as claimed in claim 5 in which said three electromagnets serve when energised to engage the second, third and fourth gears of the vehicle, said switch means being constituted by third, fourth and fifth transistors in series with the electromagnets respectively.

8. A circuit as claimed in claim 7 including means for normally biasing the third transistor on to permit engagement of second gear, and means for normally biasing the fourth and fifth transistors off.

9. A circuit as claimed in claim 8 including a second bistable circuit drivable by said voltage from a first state to a second state at a third engine speed in excess of the first engine speed, and drivable back to its first state at a fourth engine speed intermediate the third and first engine speeds, the second bistable circuit serving when in its second state to hold the third transistor off to prevent engagement of the second gear, and to bias the fourth transistor on to permit engagement of the third gear.

10. A circuit as claimed in claim 9 in which the second bistable circuit is a Schmitt trigger.

11. A circuit as claimed in claim 9 including a third bistable circuit drivable by said voltage from a first state to a second state at a fifth engine speed in excess of the third engine speed, and drivable back to its first state at a sixth engine speed intermediate the fifth and third engine speeds, the third bistable circuit serving when in its second state to hold the fourth transistor off to prevent engagement of the third gear, and to bias the fifth transistor on to permit engagement of the fourth gear.

12. A circuit as claimed in claim 11 in which said third bistable circuit is a Schmitt trigger.

13. A circuit as claimed in claim 11, including a sixth transistor through which the third gear electromagnet can be energised when the fourth transistor is non-conductive so as to hold-on the third gear below said fourth speed, and means for holding the sixth transistor non-conductive to prevent the hold-on condition when the engine speed falls below said second engine speed, when the circuit has not operated to engage third gear, and when the vehicle accelerator is depressed beyond a predetermined light throttle position.

14. A circuit as claimed in claim 13, including a seventh transistor through which the fourth gear electromagnet can be energised when the fifth transistor is non-conductive so as to hold-on the fourth gear below said sixth speed, and means for holding the seventh transistor non-conductive to prevent the hold-on condition when the engine speed falls below said second engine speed, and when the circuit has not operated to engage fourth gear, and when the vehicle accelerator pedal is depressed beyond a predetermined light throttle position.

15. A circuit as claimed in claim 14 including means operable when the vehicle accelerator pedal is depressed beyond a predetermined light throttle position for raising the engine speed at which change from second gear to third gear occurs.

16. A circuit as claimed in claim 15 including means operable when the vehicle accelerator pedal is depressed beyond a predetermined light throttle position for raising the engine speed at which change from third gear to fourth gear occurs.

17. A circuit as claimed in claim 15 including a time delay circuit which when said means is in operation and the accelerator pedal is eased to a light throttle position prevents change into a lower gear for a predetermined period of time.

18. A circuit as claimed in claim 16 including a time delay circuit which when said means is in operation and the accelerator pedal is eased to a light throttle position prevents change into a lower gear for a predetermined period of time.

19. A circuit as claimed in claim 17 in which the time delay circuit comprises a Schmitt trigger and an associated capacitor which prevents the Schmitt trigger from changing state while the capacitor charges when the accelerator pedal is eased.

20. A circuit as claimed in claim 18 in which the time delay circuit comprises a Schmitt trigger and an associated capacitor which prevents the Schmitt trigger from changing state while the capacitor charges when the accelerator pedal is eased.

21. A circuit as claimed in claim 16 including means operable when the vehicle accelerator pedal is fully depressed for further raising the engine speed at which change from third gear to fourth gear occurs.

22. A circuit as claimed in claim 7 including a first manually operable switch in series with the common transistor and through which current flows to energise the electromagnets, and a second manually operable switch connected in series with the common transistor and providing an alternative path through which the third gear electromagnet can be energised, said alternative path including a control transistor which is biased off by the first bistable circuit when the latter is in its first state.

23. A circuit as claimed in claim 8 including means for preventing engagement of second gear above a predetermined engine speed as a result of a fault.

24. A circuit as claimed in claim 23 including means for preventing engagement of second gear above a predetermined engine speed as a result of a fault, said means serving in addition to permit engagement of third gear when the first bistable circuit is in its first state.

25. A circuit as claimed in claim 24 including a third manually operable switch in series with the common transistor and providing an alternative path through which the second gear electromagnet can be energised.

26. A circuit as claimed in claim 25 including an additional electromagnet which when energised engages first gear of the vehicle, and a fourth manually operable switch in series with the common transistor and providing a path for engagement of the first gear electromagnet.

27. A circuit as claimed in claim 26 including an additional electromagnet which when energised engages reverse gear of the vehicle, and a fifth manually operable switch in series with the common transistor and providing a path for engagement of the reverse gear electromagnet.

28. A circuit as claimed in claim 27 including means operable on engagement of reverse gear for maintaining the common transistor conductive.

29. A circuit as claimed in claim 1 in which each electromagnet is in the form of a solenoid, each solenoid being bridged by a diode.

References Cited by the Examiner

UNITED STATES PATENTS

| | | | |
|---|---|---|---|
| 2,995,949 | 8/1961 | Gelenius et al. | 74—365 X |
| 3,019,666 | 2/1962 | Brennan et al. | 74—365 X |
| 3,068,715 | 12/1962 | Brennan et al. | 74—365 X |
| 3,088,337 | 5/1963 | Bemmann et al. | 74—365 X |
| 3,094,202 | 6/1963 | Issler | 74—365 X |
| 3,122,940 | 3/1964 | Shimwell et al. | 74—365 X |

DAVID J. WILLIAMOWSKY, *Primary Examiner.*

DON A. WAITE, *Examiner.*

H. S. LAYTON, *Assistant Examiner.*